United States Patent
Leibl

(10) Patent No.: US 10,492,283 B2
(45) Date of Patent: Nov. 26, 2019

(54) HIGH-VOLTAGE GENERATOR FOR AN X-RAY DEVICE

(71) Applicant: Michael Leibl, Zürich (CH)

(72) Inventor: Michael Leibl, Zürich (CH)

(73) Assignee: Siemens Healthcare GmbH, Erlangen (DE)

(*) Notice: Subject to any disclaimer, the term of this patent is extended or adjusted under 35 U.S.C. 154(b) by 109 days.

(21) Appl. No.: 15/683,502

(22) Filed: Aug. 22, 2017

(65) Prior Publication Data

US 2018/0063932 A1    Mar. 1, 2018

(30) Foreign Application Priority Data

Aug. 23, 2016    (DE) .................. 10 2016 215 765

(51) Int. Cl.
| | |
|---|---|
| *H05G 1/08* | (2006.01) |
| *H05G 1/12* | (2006.01) |
| *H02M 3/335* | (2006.01) |
| *H05G 1/32* | (2006.01) |

(52) U.S. Cl.
CPC .......... *H05G 1/12* (2013.01); *H02M 3/33569* (2013.01); *H05G 1/32* (2013.01)

(58) Field of Classification Search
CPC ........ H02M 3/33569; H05G 1/12; H05G 1/32
See application file for complete search history.

(56) References Cited

U.S. PATENT DOCUMENTS

| | | | | |
|---|---|---|---|---|
| 4,317,039 A | * | 2/1982 | Romandi | ................ H05G 1/18 378/101 |
| 5,208,739 A | | 5/1993 | Sturgeon | |
| 5,629,844 A | * | 5/1997 | Krichtafovitch | .......... B03C 3/68 363/15 |
| 5,666,278 A | | 9/1997 | Ng | |
| 5,923,549 A | * | 7/1999 | Kobayashi | ............... H05G 1/54 363/17 |
| 2004/0037092 A1 | | 2/2004 | Kurio et al. | |

(Continued)

FOREIGN PATENT DOCUMENTS

| | | |
|---|---|---|
| CN | 101562399 A | 10/2009 |
| CN | 201985763 U | 9/2011 |

(Continued)

OTHER PUBLICATIONS

German Office Action for German Application No. 102016215765.5, dated Apr. 19, 2017.

(Continued)

*Primary Examiner* — Marcus H Taningco
(74) *Attorney, Agent, or Firm* — Lempia Summerfield Katz LLC

(57) ABSTRACT

A high-voltage generator for an X-ray device includes an input-side inverter unit, an output-side rectifier unit and a transformer connected between the inverter unit and the rectifier unit. The inverter unit is configured to generate two inverter voltages that are phase-shifted with respect to each other. These inverter voltages are transformed by the transformer into two rectifier voltages that are fed to the rectifier unit such that in no-load operation, one of the two rectifier voltages is proportional to the sum of the inverter voltages while the other of the two rectifier voltages is proportional to the difference between the inverter voltages.

16 Claims, 6 Drawing Sheets

(56) References Cited

U.S. PATENT DOCUMENTS

| | | | |
|---|---|---|---|
| 2004/0218404 A1 | 11/2004 | Yan et al. | |
| 2008/0130323 A1 | 6/2008 | Wagner et al. | |
| 2008/0247195 A1 | 10/2008 | Nakahori | |
| 2011/0075796 A1* | 3/2011 | Loef | A61B 6/56 378/15 |
| 2011/0222651 A1* | 9/2011 | Ogawa | H02M 7/53871 378/20 |

FOREIGN PATENT DOCUMENTS

| | | |
|---|---|---|
| CN | 202261015 U | 5/2012 |
| DE | 2141530 A1 | 3/1973 |
| JP | H05173433 A | 7/1993 |

OTHER PUBLICATIONS

Chinese Office Action for Chinese Patent Application No. 201710728756.1, dated Aug. 22, 2019.
Fontana, Christian, et al. "Design characteristics of SAB and DAB converters." 2015 Intl Aegean Conference on Electrical Machines & Power Electronics (ACEMP), 2015 Intl Conference on Optimization of Electrical & Electronic Equipment (OPTIM) & 2015 Intl Symposium on Advanced Electromechanical Motion Systems (Electromotion). IEEE, 2015.
German Office Action for German Application No. 10 2017 212 224.2 dated Apr. 30, 2019.
Huber, Jonas E., and Johann W. Kolar. "Analysis and design of fixed voltage transfer ratio DC/DC converter cells for phase-modular solid-state transformers." 2015 IEEE Energy Conversion Congress and Exposition (ECCE). IEEE, 2015.

* cited by examiner

HIGH-VOLTAGE GENERATOR FOR AN X-RAY DEVICE

RELATED CASE

This application claims the benefit of DE 102016215765.5, filed on Aug. 23, 2016, which is hereby incorporated by reference in its entirety.

BACKGROUND

The present embodiments relate to a high-voltage generator for an X-ray device.

A high-voltage generator used to supply an X-ray device has in the customary configuration an inverter on the input side, a rectifier on the output side and a transformer connected between the inverter and the rectifier. The inverter in this arrangement feeds a primary winding of the transformer with an inverter voltage that the transformer transforms into a rectifier voltage fed to the rectifier. The rectifier voltage is then converted by the rectifier into an output voltage to be fed to the X-ray device. The rectifier used in such a high-voltage generator is customarily a passive rectifier, (e.g., a rectifier that is equipped solely with diodes).

High-voltage generators for X-ray devices are usually designed for both high output voltages of up to 150 kV and high peak power levels of up to 100 kW. The transformers used to generate the high voltage are customarily operated at a frequency of approximately 50 kHz in order to permit a compact design despite the high power level and voltage.

The average heat loss to the environment over time of an X-ray device is generally low relative to the aforementioned peak power, however, because X-ray devices are usually operated either in a pulsed manner or at low power in continuous duty. The associated high-voltage generators, in particular the transformers thereof, therefore do not generally have to be designed for continuous duty at peak power.

This makes it possible to realize the transformer in a very compact form. Such a transformer often has relatively high stray inductance. This is disadvantageous, as under load the stray inductance causes a voltage drop that has to be compensated for with appropriate measures.

It is possible in principle to compensate for this voltage drop by adopting an overdimensioned transformation ratio $n=N_2/N_1$ for the transformer (i.e., the ratio of the number of windings $N_2$ of the secondary winding to the number of windings $N_1$ of the primary winding). The transformation ratio is selected in this case to be higher than the voltage transformation ratio to be achieved so that the required output voltage is reached even when the high-voltage generator is operated at peak power. An increase in the transformer transformation ratio, however, has the unfavorable effect of also increasing the rms value of the inverter currents. The semiconductor components of the inverter have to be designed to accommodate these elevated inverter currents, which leads to increased production expense.

It is therefore customary for cost reasons to insert a capacitor in series with the primary winding to compensate for the stray inductance of the transformer. The resulting circuit is also referred to as a "series resonant converter" because of the fact that the capacitor forms a series resonant circuit with the primary winding. It is possible to realize a virtually load-independent output voltage with the series resonant converter if the resonant frequency of the series resonant circuit is tuned to the switching frequency of the inverter. The transformation ratio of the transformer consequently need not be overdimensioned in relation to the maximum voltage transformation ratio to be achieved with this solution. The output voltage may be regulated by varying the switching frequency and/or the duty cycle of the inverter. The behavior of the series resonant converter is unfavorable from a regulation technology perspective though because the serial oscillator circuit forms a second order system at the resonant frequency. Moreover with the series resonant converter, "hard switching" (i.e., the switching on of the semiconductor switches of the inverter under voltage) may only be avoided by appropriate variation of the switching frequency. This complicates regulation and disadvantageously makes it necessary to measure the current zero-crossing point of the inverter current.

US 2004/0218404 A1 (specifically FIG. 11 therein) discloses a step-up DC-DC converter that has a three-legged transformer core (E core). Each of the two outer legs of the E core in this arrangement is wound with a primary winding that is activated cyclically by a transistor. Each of the two outer legs of the E core also has a secondary winding where these secondary windings are connected in series with a passive bridge rectifier. The central leg of the E core, which has an air gap, bears a third secondary winding connected via a diode in parallel with the bridge rectifier.

Other DC-DC converters, some of which are envisaged as a high-voltage generator for an X-ray device, are disclosed in US 2008/0247195 A1, US 2008/0130323 A1 and US 2004/0037092 A1.

SUMMARY AND DETAILED DESCRIPTION

The object of the present embodiments is a further improved high-voltage generator for an X-ray device.

The high-voltage generator according to an embodiment has an input-side inverter, an output-side rectifier and a transformer connected between the inverter and the rectifier. The inverter in this case is configured to generate two inverter voltages that are phase-shifted with respect to each other. These inverter voltages are transformed by the transformer into two rectifier voltages that are fed to the rectifier such that, when the high-voltage generator is operating with no load (i.e., with negligible active power), one of the two rectifier voltages is proportional to the sum of the inverter voltages while the other of the two rectifier voltages is proportional to the difference between the inverter voltages.

The embodiment proceeds from the supposition that it is advantageous in principle to replace the simple inverter-rectifier chain of conventional circuit topologies with two-phase inverter and rectifier in which two inverters and two rectifiers respectively are connected in series on the input side and the output side respectively. The two inverters in this case are operated in a normal operating mode with a 90° phase offset such that the two inverter voltages have a phase offset of 90° in the normal operating mode. This suppresses components of the output voltage ripple (i.e., switching-induced fluctuations in the output voltage) with double the switching frequency. Instead, output voltage ripples with four times the switching frequency dominate. This makes it possible to reduce the output capacitance of the high-voltage generator considerably. The fall time of the tube voltage is advantageously shortened accordingly.

A decisive increase in effectiveness is realized in this case by the relationship between inverter voltages and rectifier voltages described above, according to which one of the two rectifier voltages corresponds to the sum of the inverter voltages and the other of the two rectifier voltages corresponds to the difference between the inverter voltages. The primary-side two-phase system is thus translated into a secondary-side two-phase system that is rotated by 45° (or, in an equivalent manner, by 135°, 225° or 315°) (i.e., phase-shifted), with respect to the primary-side two-phase system.

The output voltage of this high-voltage generator in no-load operation here corresponds to the input voltage multiplied with the transformation ratio of the transformer. As is known, however, the rms value of the current in the inverter corresponds only to the $n/\sqrt{2}$-fold multiple of the rms value of the current in the rectifier. This makes it possible to achieve a situation in which the current stress on the semiconductors is similar to that in a series resonant converter even with an overdimensioned transformation ratio for the transformer. The converter topology according to the embodiment also has other advantages over a conventional series resonant converter.

Thus, the high-voltage generator exhibits more favorable behavior from a regulation technology perspective, for example, because the dynamic characteristics of the open regulation loop approximate to those of a first order system, whereas a series resonant converter, as already mentioned, represents a second order system.

In addition, the high-voltage generator topology also makes it possible to realize soft switching at the inverters (i.e., switching of the semiconductor switches involved at zero voltage) even with a constant switching frequency.

The inverter preferably includes two inverters that feed the two primary winding systems with one of the two inverter voltages each. The primary winding systems are in this case assigned to the two inverters in pairs such that each of the two inverters feeds just one of the two primary winding systems.

Each of the two inverters has in particular, in a manner customary in itself, two half-bridges in each case connected in parallel with each other in an intermediate DC circuit. The inverter-side half-bridges in an expedient embodiment are active (i.e., actively switchable) half-bridges, each of which has two series-connected semiconductor switches each with parallel freewheeling diode. The associated primary winding system here is in each case connected to a center tap between the two semiconductor switches of the half-bridge.

The rectifier accordingly preferably includes two rectifiers connected in series across an output voltage that are each fed with one of the two rectifier voltages via two secondary winding systems.

Each of the two rectifiers in an expedient embodiment similarly has two half-bridges connected in parallel with each other in an intermediate DC circuit. The rectifier, however, is advantageously designed as a passive rectifier system. The half-bridges of the rectifiers are in this case equipped solely with passive (not actively switchable) semiconductor elements, in particular diodes. Additionally or alternatively, the rectifiers preferably have capacitive damping. The rectifier thus has no reactors on the output side (i.e., in the DC path).

Each of the two primary winding systems in a preferred embodiment of the high-voltage generator has two primary windings connected in series. The transformer has two (independent) transformer cores, each of which is wound with a primary winding of the two primary winding systems. A first transformer core is thus wound with a first primary winding of a first primary winding system and a first primary winding of the second primary winding system while the second transformer core is wound with the second primary winding of a first primary winding system and the second primary winding of the second primary winding system.

The phase offset of 45° between the inverter voltages and the rectifier voltages is realized by having the two primary windings in one of the two primary winding systems connected in series in the same direction and the two primary windings in the other of the two primary winding systems connected in series in opposing directions. All of the primary windings are in this case preferably placed on the relevant transformer core with the same direction of winding.

The two inverters are connected in series across an input voltage in an expedient variant of the high-voltage generator.

The two inverters in a preferred alternative variant, on the other hand, are connected parallel to each other in the input voltage. The two half-bridges of each inverter are connected in series in each case. In other words, the two half-bridges of each inverter are shared between the series-connected intermediate DC circuits of the inverter. This advantageously avoids the two inverters (and the associated intermediate circuits) also being loaded asymmetrically if the two rectifiers are loaded asymmetrically.

A capacitor that serves to take half the input voltage is inserted in an expedient embodiment between the two primary windings of each primary winding system. The capacitance of this capacitor is selected in an expedient embodiment to be large enough that the resonant frequency of the serial oscillator circuit formed by the capacitor and the stray inductance of transformer is significantly below (e.g., by at least a factor of 10 and preferably by at least a factor of 100) the switching frequency of the inverter.

The inverters in an alternative embodiment are connected in parallel with each other in an input-side intermediate circuit and thus in the input voltage. The input voltage here is only half as high as in the embodiment described above with the same high-voltage generator design. The capacitor is unnecessary in this case and thus preferably also not present.

A further alternative embodiment of the high-voltage generator has the phase offset between the inverter and rectifier voltages (e.g., −45°) effected on the secondary side rather than on the primary side. The primary and secondary windings in this instance are arranged as a quasi-mirror-image of the embodiments described above.

Each of the two secondary winding systems in this instance accordingly contains two secondary windings connected in series. In this embodiment, the transformer too has two (independent) transformer cores, each of which is wound with a secondary winding of the two secondary winding systems. The two secondary windings in one of the two secondary winding systems in this instance are connected in series in the same direction and the two secondary windings in the other of the two secondary winding systems are connected in series in opposing directions.

The secondary winding systems are assigned to the two rectifiers in pairs here in an expedient embodiment.

The transformer in a further embodiment of the high-voltage generator includes a transformer core with three parallel legs that are connected on both sides by yokes. Such a transformer core, which is of a type customarily also used in three-phase transformers, by way of example, has the form of a number "8" in the assembled state. It is often composed of two parts that have the form of the uppercase letters "E" and "I". Such a transformer core is thus also commonly referred to as an "E core" or "EI core".

In the embodiment described above too, the high-voltage generator has, in an advantageous variant, a first primary winding system that contains two primary windings connected in series and is fed by the inverter with one of the two inverter voltages. The high-voltage generator also includes a second primary winding system that contains a further primary winding and is fed by the inverter with the other of the two inverter voltages.

The central leg of the transformer core is wound in this instance with the primary winding of the second primary winding system. The outer legs or the adjacent sections of one of the two yokes, on the other hand, are wound with the two primary windings of the first primary winding system such that one of the two primary windings of the first primary winding system is oriented in the same direction as the primary winding of the second primary winding system while the other of the two primary windings of the first primary winding system is oriented in opposing directions with the primary winding of the second primary winding system.

Another embodiment is a mirror-image variant of the embodiment of the high-voltage generator described above. There are present a first secondary winding system with two secondary windings connected in series and a second secondary winding system with a further secondary winding.

The rectifier in this instance is fed with one of the two rectifier voltages in each case via each of the two secondary winding systems.

The central leg of the transformer core is wound in this instance with the secondary winding of the second secondary winding system. The outer legs or the adjacent sections of one of the two yokes, on the other hand, are wound with the two secondary windings of the first secondary winding system such that one of the two secondary windings of the first secondary winding system is oriented in the same direction as the secondary winding of the second secondary winding system while the other of the two secondary windings of the first secondary winding system is oriented in opposing directions with the secondary winding of the second secondary winding system.

The or each transformer core is preferably designed with no air gap.

BRIEF DESCRIPTION OF THE DRAWINGS

Exemplary embodiments are explained in greater detail below with reference to the drawingS, in which.

Corresponding parts and quantities are always marked with the same reference characters in all figures.

DETAILED DESCRIPTION OF EXEMPLARY EMBODIMENTS

Figure 1:
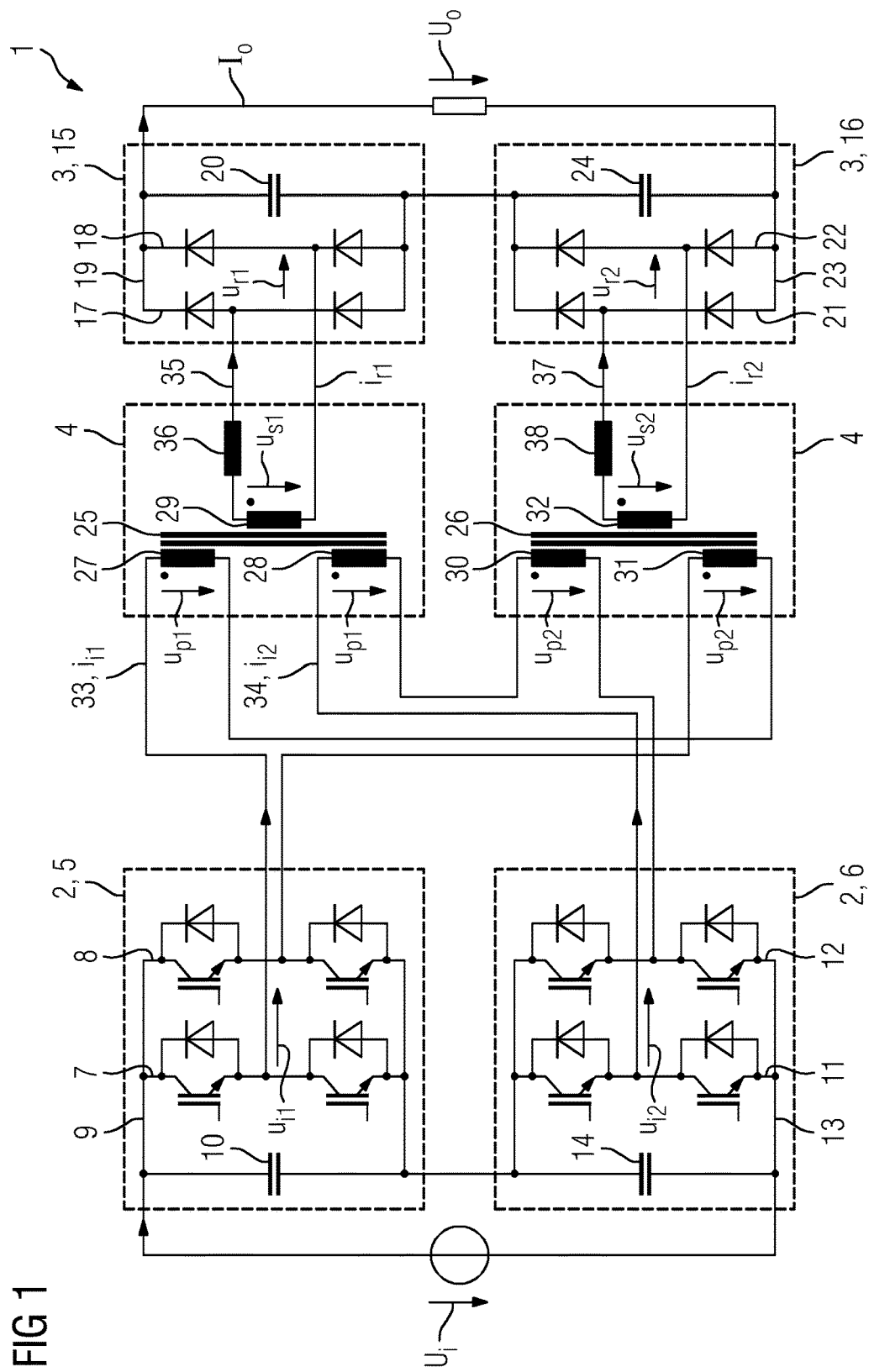
FIG. 1 shows an electric circuit diagram of one embodiment of a high-voltage generator for an X-ray device having an input-side inverter unit, which has two inverters connected in series across an input voltage, having an output-side rectifier unit, which has two rectifiers connected in series across an output voltage, and having a transformer connected between the inverter unit and the rectifier unit, it being the case that the inverter unit feeds each of two primary winding systems of the transformer with an inverter voltage and that each of the primary winding systems contains two primary windings.

The high-voltage generator 1 shown in FIG. 1 has an input-side inverter unit 2, an output-side rectifier unit 3 and a transformer 4 connected between this inverter unit and rectifier unit.

The inverter unit 2 is formed from two inverters 5 and 6 that are connected in series across a constant input voltage $U_i$ of, for example, 800 Volts.

The inverter 5 is formed from two half-bridges 7 and 8 that are connected in parallel with each other in an intermediate (DC) circuit 9 with an (intermediate circuit) capacitor 10. In each of the two half-bridges 7 and 8, the inverter 5 has in each case two series-connected active semiconductor switches (e.g., in the form of insulated gate bipolar transistors or IGBT) with a freewheeling diode connected in parallel in each case.

Similarly the inverter 6 also has two half-bridges 11 and 12 connected in parallel with each other in an intermediate (DC) circuit 13 with an (intermediate circuit) capacitor 14. The half-bridges 11 and 12 are also formed by a series circuit of in each case two active semiconductor switches (e.g., IGBT) with a freewheeling diode connected in parallel in each case.

The rectifier unit 3 is formed from two rectifiers 15 and 16 that are connected in series across an output voltage $U_o$.

The rectifier 15 includes two half-bridges 17 and 18 that are connected in parallel with each other in an intermediate (DC) circuit 19 with an (intermediate circuit) capacitor 20. Each of the two half-bridges 17 and 18 in this instance contains a series circuit of two diodes.

The rectifier 16 is likewise formed from two half-bridges 21 and 22 that are connected in parallel with each other in an intermediate (DC) circuit 23 with an (intermediate circuit) capacitor 24. The half-bridges 21 and 22 are also each formed by a series circuit of two diodes.

The transformer 4 contains two transformer cores 25 and 26 (e.g., annular transformer cores with no air gap). The transformer core 25 is in this instance wound with two primary windings 27 and 28 and one secondary winding 29. The transformer core 26 is similarly wound with two primary windings 30 and 31 and one secondary winding 32. All of the primary windings 27,28,30,31 have the same number of windings $N_1$ (e.g., where $N_1=6$) and, in the example according to FIG. 1, the same direction of winding. The secondary windings 29 and 32 each have a greater number of windings $N_2$ (for example $N_2=1600$).

The number of windings $N_2$ is chosen such that the transformation ratio n (where $n=N_2/N_1$) of the transformer 4 is overdimensioned with respect to the desired maximum voltage transformation ratio $U_o/U_i$, for example by a factor of 1.4, in order to compensate for losses in the transformer 4.

The two primary windings 27 and 31, each of which is assigned to a different one of the two transformer cores 25 and 26, are combined to form a primary winding system 33, while the other two primary windings 28 and 30, each of which is assigned to a different one of the two transformer cores 25 and 26, are combined to form a primary winding system 34. The primary winding system 33 formed by the primary windings 27 and 31 is connected between center taps (terminals) of the half-bridges 7 and 8 of the first inverter 5. The primary winding system 34 formed by the other primary windings 28 and 30 is connected between center taps (terminals) of the half-bridges 11 and 12 of the inverter 6. The primary windings 28 and 30 in the primary winding system 34 are connected in series in the same direction (in relation to their direction of winding), while the primary windings 27 and 31 in the primary winding system 33 are connected in series in opposing directions.

Connected between center taps of the half-bridges 17 and 18 of the rectifier 15 is a secondary winding system 35 that in the exemplary embodiment according to FIG. 1 contains only the secondary winding 29. A further inductance is shown in series with the secondary winding 29 in FIG. 1. This is not, however, a physical component, but rather an equivalent circuit diagram that represents the stray inductance 36 of the transformer core 25 and the associated windings.

Similarly, there is connected between center taps of the half-bridges 21 and 22 of the rectifier 16 a secondary winding system 37 that in the exemplary embodiment according to FIG. 1 contains just the secondary winding 32. Here too the stray inductance 38 of the transformer core 26 and the associated windings is indicated as an equivalent circuit diagram.

When the high-voltage generator 1 is operating, the inverter 5 feeds the primary winding system 33 with an inverter voltage $u_{i1}$ that causes a current with an (inverter) current strength $i_{i1}$ to flow in the primary winding system 33. Primary voltages $u_{p1}$ and $u_{p2}$ fall here across the two primary windings 27 and 31 of the primary winding system 33. The inverter 6 similarly feeds the primary winding system 34 with an inverter voltage $u_{i2}$ that causes a current with an (inverter) current strength $i_{i2}$ to flow in the primary winding system 34, it being the case that the primary voltages $u_{p1}$ and $u_{p2}$ likewise fall across the two primary windings 28 and 30. The fact that the primary coils 27,28,30 and 31 have the same number of windings $N_1$ means that the voltage fall for the two primary coils 27 and 28, and 30 and 31, respectively, coupled by a shared transformer core 25 or 26 are the same in each case due to the law of induction.

The primary voltage $u_{p1}$ causes a secondary voltage $u_{s1}$ to be induced in the secondary coil 29 via the transformer core 25, which secondary voltage $u_{s1}$ generates a current with a (rectifier) current strength $i_{r1}$ in the secondary winding system 35 and a rectifier voltage $u_{r1}$ between the half-bridges 17 and 18 of the rectifier 15.

The primary voltage $u_{p2}$ similarly causes a secondary voltage $u_{s2}$ to be induced in the secondary winding 32 via the transformer core 26, which secondary voltage $u_{s2}$ generates a current with a rectifier current strength $i_{r2}$ in the secondary winding system 37 and a rectifier voltage $u_{r2}$ between the half-bridges 21 and 22 of the rectifier 16.

The fact that the primary windings 27 and 31, and 28 and 30, are connected in the same direction and in opposite directions, respectively, means that the inverter voltages $u_{i1}$ and $u_{i2}$ correspond to the difference and sum, respectively, of the primary voltages $u_{p1}$ and $u_{p2}$:

$$u_{i1} = u_{p1} - u_{p2} \qquad \text{Eq 1.1}$$

$$u_{i2} = u_{p1} + u_{p2} \qquad \text{Eq 1.2}$$

Reversing this system of equations produces the following for the primary voltages:

$$u_{p1} = \frac{1}{2} \cdot (u_{i1} + u_{i2}) \text{ and} \qquad \text{Eq 2.1}$$

$$u_{p2} = \frac{1}{2} \cdot (-u_{i1} + u_{i2}) \qquad \text{Eq 2.2}$$

The primary voltage $u_{p1}$ thus corresponds to half of the sum of the two inverter voltages $u_{i1}$ and $u_{i2}$ (i.e., the common mode portion of the two inverters 5,6), while the primary voltage $u_{p2}$ corresponds to half of the difference between the two inverter voltages $u_{i1}$ and $u_{i2}$ (i.e., the differential mode portion of the two inverters 5,6).

Figure 2:
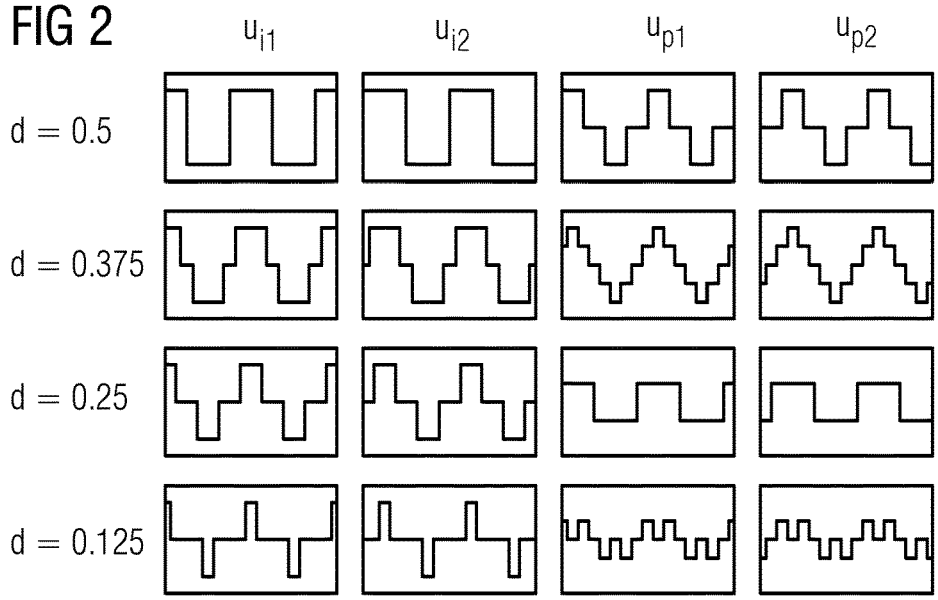
FIG. 2 shows 16 diagrams arranged in a 4×4 matrix, each of which depicts an example of the relevant course over time of the two inverter voltages (first and second columns from the left) and an example of the course over time of the falling primary voltages in the primary windings of the transformer (third and fourth columns from the left) for different duty cycles (rows one to four)

Both inverter voltages $u_{i1}$, $u_{i2}$ are generated in the normal operating mode of the high-voltage generator 1 as pulsed square wave voltages with the same duty cycle (pulse/pause ratio) d, which means that both inverter voltages $u_{i1}$, $u_{i2}$ have the same form, but with a phase offset of 90°. The two primary voltages $u_{p1}$ and $u_{p2}$ thus also have the same form and a phase offset of 90°. Eq 2.1 and 2.2 yield the form of the inverter voltages $u_{i1}$ and $u_{i2}$ and the primary voltages $u_{p1}$ and $u_{p2}$ as depicted in FIG. 2 as a function of the duty cycle d.

When the duty cycle is 50% (d=0.5), each of the primary voltages $u_{p1}$ and $u_{p2}$ thus assumes the mean value of the two intermediate circuit voltages of the two inverters 5,6 for one quarter of the period duration in each period, followed by a zero interval lasting a further quarter of the period and an identical half-wave with the opposite leading sign.

The peak value of the primary voltages $u_{p1}$ and $u_{p2}$ thus corresponds to the mean value of the two intermediate circuit voltages of the inverters 5,6. The maximum voltage-time area is only half as large as for the inverter voltages $u_{i1}$ and $u_{i2}$, however, so the number of windings of the primary and secondary windings may be halved in each case in the circuit according to FIG. 1 as compared with a transformer wound with a single primary coil at the same flux density in the transformer core. The stray inductance is proportional to the square of the number of windings, so halving the number of windings of the transformer 4 (relative to the comparative circuit described above) reduces the stray inductance to a quarter of the level in the comparative circuit described above.

As with conventional topologies, the maximum value reached by the output voltage $U_o$ in no-load operation of the high-voltage generator 1 depends on the transformation ratio n of the transformer 4 and the input voltage $U_i$. This no-load voltage $U_{o,max}$ is calculated thus:

$$U_{o,max} = n \cdot U_i \qquad \text{Eq 3}$$

The maximum value that may be reached for the output current $I_o$ occurs with short-circuited output. This short-circuit current $I_{o,max}$ amounts to $$I_{o,max} = \frac{3 \cdot nU_i}{64 \cdot f \cdot L_\sigma} \qquad \text{Eq 4}$$

where f is the switching frequency of the inverters 5,6 and $L_\sigma$ is the stray inductance 36,38.

The short-circuit current $I_{o,max}$ is thus higher by a factor of three than with a conventional topology in which the transformer cores 25 and 26 are wound with just a single primary winding and are each fed from a single inverter 5 and 6, respectively. The high-voltage generator 1 shown in FIG. 1 also allows higher output currents than the conventional topology at other operating points.

The use of two primary windings 27,28 and 30,31, respectively, per transformer core 25 and 26, respectively, means that in each case both inverter currents $i_{i1}$ and $i_{i2}$ contribute to the formation of the rectifier currents $i_{r1}$ and $i_{r2}$, so that for the latter the relationships:

$$n \cdot i_{r1} = i_{i1} + i_{i2} \quad \text{Eq 5.1}$$

$$n \cdot i_{r2} = -i_{i1} + i_{i2} \quad \text{Eq 5.2}$$

apply.

Reversing this system of equations produces the following for the inverter currents:

$$i_{i1} = \frac{n}{2} \cdot (i_{r1} - i_{r2}) \quad \text{Eq 6.1}$$

$$i_{i2} = \frac{n}{2} \cdot (i_{r1} + i_{r2}) \quad \text{Eq 6.2}$$

The rms value $i_{i,eff}$ of the inverter currents $i_{i1}$ or $i_{i2}$ corresponds to:

$$i_{i,eff} = \frac{n}{\sqrt{2}} \cdot i_{r,eff}, \quad \text{Eq 7}$$

where $i_{r,eff}$ denotes the rms value of the rectifier currents $i_{r1}$ or $i_{r2}$.

The rms value $i_{i,eff}$ of the inverter currents is thus smaller by a factor of $\sqrt{2}$ than in a conventional circuit of the type described above, which significantly reduces the conduction losses in the semiconductors.

The proposed arrangement of the primary windings 27,28, 30 and 31 enables significantly reduced inverter currents throughout the operating range. The relative increase in the rms value $i_{r,eff}$ for low output currents is also smaller, which is observable primarily with output currents of less than 25% of the maximum short-circuit current and average output voltages.

The output voltage $U_o$ is controlled for the high-voltage generator 1 according to FIG. 1 by a voltage controller (not shown) via the duty cycle d of the inverter voltages $u_{i1}, u_{i2}$. The switching frequency (and thus the period length) is maintained at a constant level. The semiconductor switches of the inverters 5,6 in this case undergo soft switching (i.e., the switches are switched on in the voltage-free state). The voltage controller is preferably realized as an integral or integrated controller.

Figure 3:
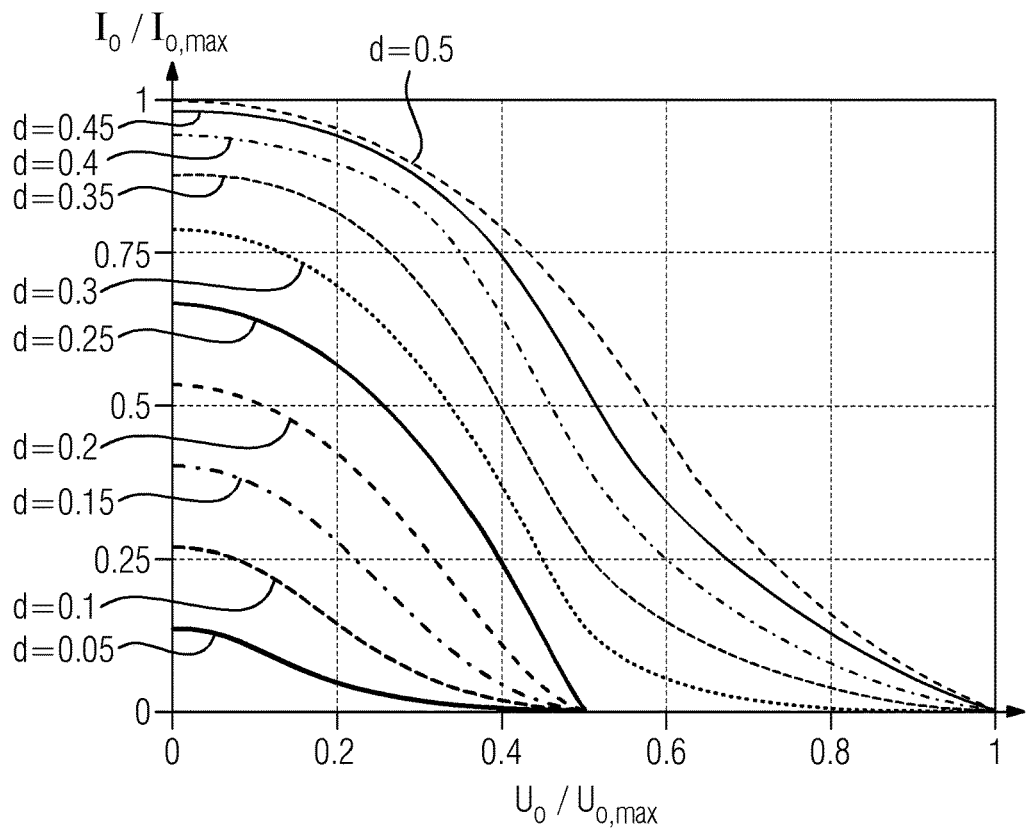
FIG. 3 shows an example output characteristic of the high-voltage generator for different duty cycles in a diagram of the normalized output voltage against the normalized output current.

FIG. 3 shows the output characteristic of the high-voltage generator 1 according to FIG. 1 for different duty cycles d (namely for d=0.05, 0.1, 0.15, 0.2, 0.25, 0.3, 0.35, 0.4, 0.45 and 0.5). The output characteristic is defined in this instance by the course of the output current $I_o$, normalized for the short-circuit current $I_{o,max}$, plotted against the output voltage $U_o$, normalized for the no-load voltage $U_{o,max}$ ($I_o/I_{o,max} = I_o/I_{o,max} (U_o/U_{o,max}, d)$).

It can be seen from FIG. 3 that the output current $I_o$ falls as the output voltage $U_o$ rises, which acts to counter an overshoot of the output voltage $U_o$ and allows a high gain for the voltage controller and thus a high dynamic level for the output voltage control.

Figure 4:
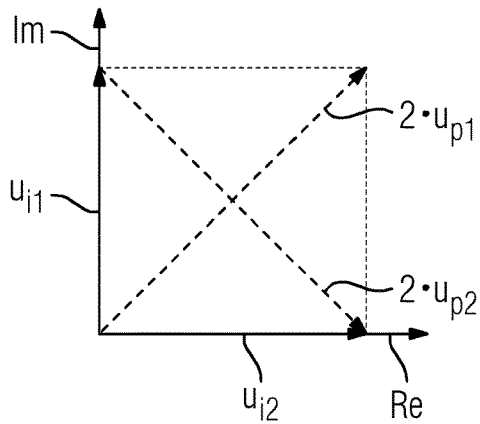
FIGS. 4 to 6 each show an example of the fundamental component vector for the inverter voltages and the primary voltages in a complex vector diagram.

FIG. 4 illustrates, in a vector diagram, the relative phase angle of the respective fundamental component of the inverter voltages $u_{i1}$ and $u_{i2}$ in the normal operating mode and the primary voltages $u_{p1}$ and $u_{p2}$ resulting from this according to Eq 2.1 and 2.2 in the normal operating mode of the high-voltage generator 1. The labels "Re" and "Im" here denote the real and imaginary axes of the vector diagram. As already mentioned, the inverter voltages $u_{i1}, u_{i2}$ are generated with a phase offset of 90° so that the fundamental components of the inverter voltages $u_{i1}, u_{i2}$ are orthogonal. The primary voltages $u_{p1}, u_{p2}$ are thus likewise orthogonal, but are phase-shifted with respect to the inverter voltages $u_{i1}, u_{i2}$ by a phase angle of 45°.

The secondary voltages $u_{s1}$ and use and the resulting rectifier voltages $u_{r1}$ and $u_{r2}$ each have the same phase angle as the corresponding primary voltage $u_{p1}$ and $u_{p2}$, respectively, in no-load operation. This means that in no-load operation, the rectifier voltages $u_{r1}$ and $u_{r2}$ too are orthogonal and shifted with respect to the inverter voltages $u_{i1}$ and $u_{i2}$ by a phase angle of 45°. Specifically, the rectifier voltages $u_{r1}$ and $u_{r2}$ in no-load operation are determined from the inverter voltages $u_{i1}$ and $u_{i2}$ in accordance with $$u_{r1} = \frac{n}{2} \cdot (u_{i1} + u_{i2}) \quad \text{Eq 8.1}$$

$$u_{r2} = \frac{n}{2} \cdot (-u_{i1} + u_{i2}) \quad \text{Eq 8.2}$$

If the two series-connected rectifiers 15 and 16 are loaded asymmetrically, this also produces an asymmetric distribution of the proportions in which the rectifiers 15,16 contribute to the output voltage $U_o$. Such asymmetry is undesirable due to the limited withstand voltage of the semiconductor components used. If such asymmetry occurs, the intermediate circuit voltages of the two rectifiers 15,16 are therefore rendered symmetrical by actively increasing or reducing the phase offset between the inverter voltages $u_{i1}$ and $u_{i2}$ with respect to the normal value of 90° on the inverter side. This is illustrated in a vector diagram in FIG. 5 and FIG. 6.

Figure 5:
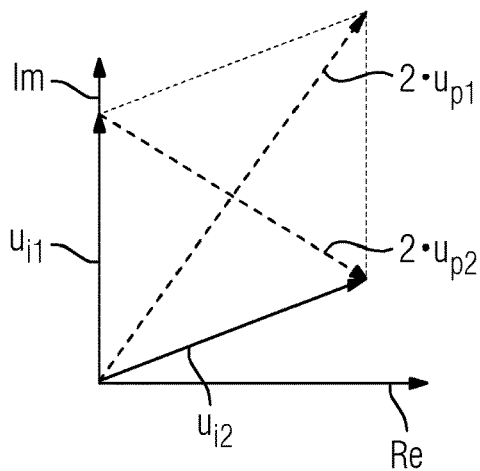
Figure 6:
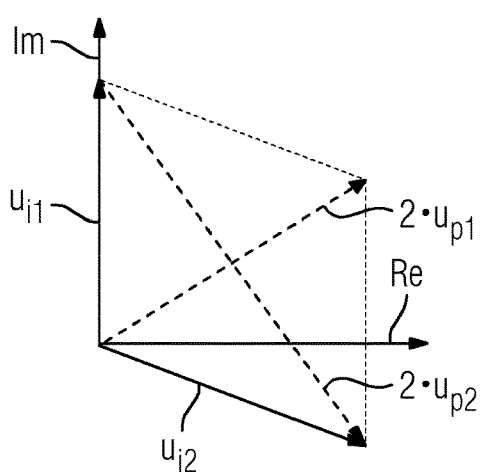

It can be seen from FIG. 5 and FIG. 6 that with a phase offset other than 90°, the fundamental components of the primary voltages $u_{p1}$ and $u_{p2}$ differ in size, which causes the rectifier currents $i_{r1}$ and $i_{r2}$ to differ as well. A further controller is used to set the phase offset between the inverter voltages $u_{i1}$ and $u_{i2}$ to balance out the rectifiers 15,16 by applying different rectifier currents $i_{r1}$ and $i_{r2}$ to them where applicable.

If the rectifiers 15,16 are loaded asymmetrically, however, this also leads in the exemplary embodiment according to FIG. 1 to asymmetric loading of the two inverters 5,6, which results in an uneven voltage distribution in the series circuit of the inverters 5,6.

Figure 7:
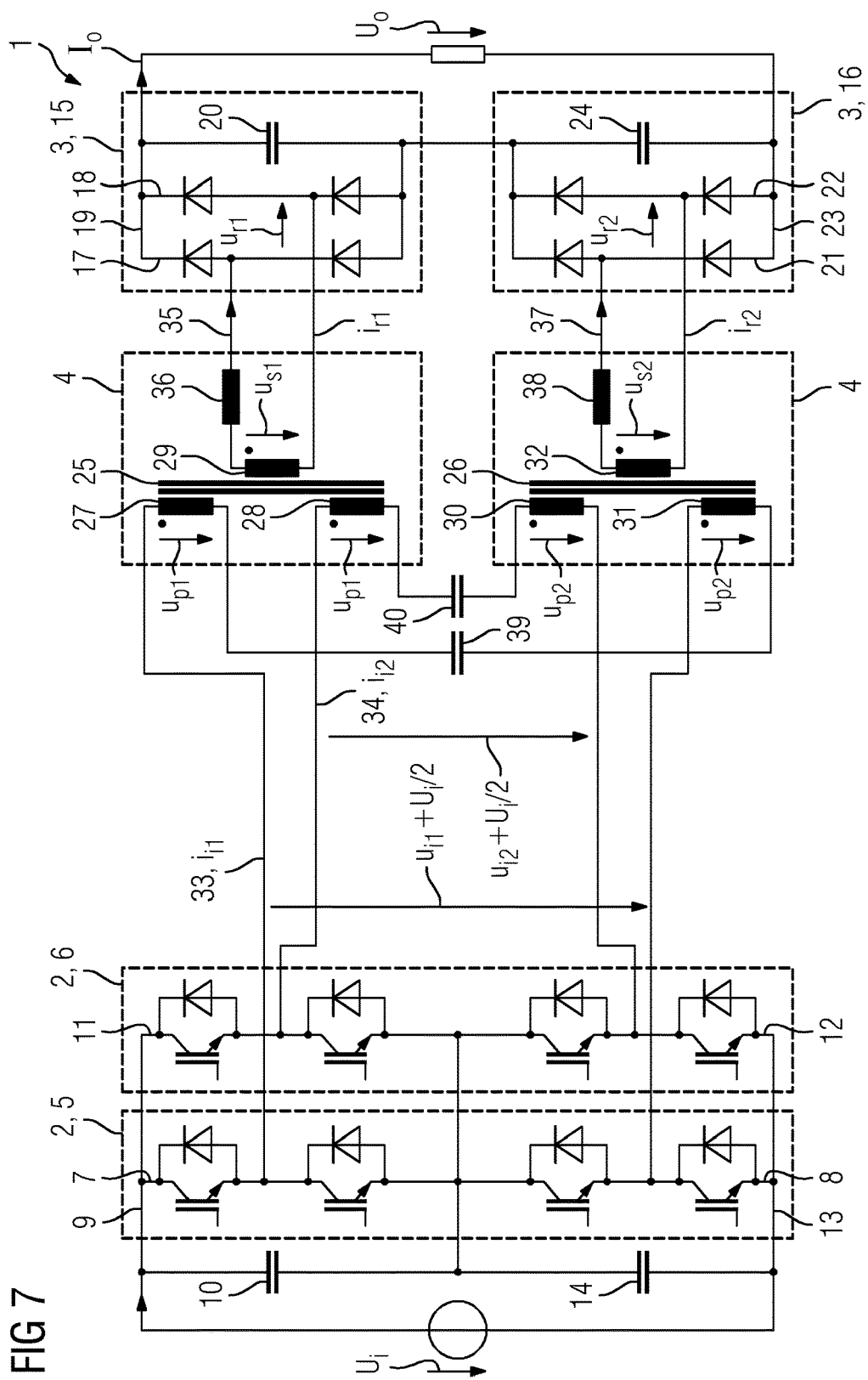
FIG. 7 shows an alternative embodiment of the high-voltage generator depicted in accordance with FIG. 1.

This is avoided in a variant of the high-voltage generator 1 shown in FIG. 7 by connecting one of the two half-bridges 7,11 of the inverters 5 and 6 to the intermediate circuit capacitor 10 and the other half-bridges 8,12 of the inverters 5 and 6 to the intermediate circuit capacitor 14. This means, in other words, that the two inverters 5,6 are each shared between the intermediate circuits 9 and 13, which are connected in series. The primary winding systems 33 and 34 are connected here, as already established, between the half-bridges 7 and 8 of the inverter 5 and between the half-bridges 11 and 12 of the inverter 6.

Each of the two primary winding systems 33 and 34 in a high-voltage generator 1 according to FIG. 7 has connected between the primary windings 27 and 31, and 28 and 30, respectively, a capacitor 39 and 40 that accepts half of the input voltage $U_i$. The capacitance of this capacitor 39,40 is dimensioned to be large enough that the resonant frequency of the oscillator circuits formed from the capacitors 39,40 and the stray inductance 36 and 38 is well below the switching frequency with which the semiconductor switches in the inverters 5 and 6 are switched.

Figure 8:
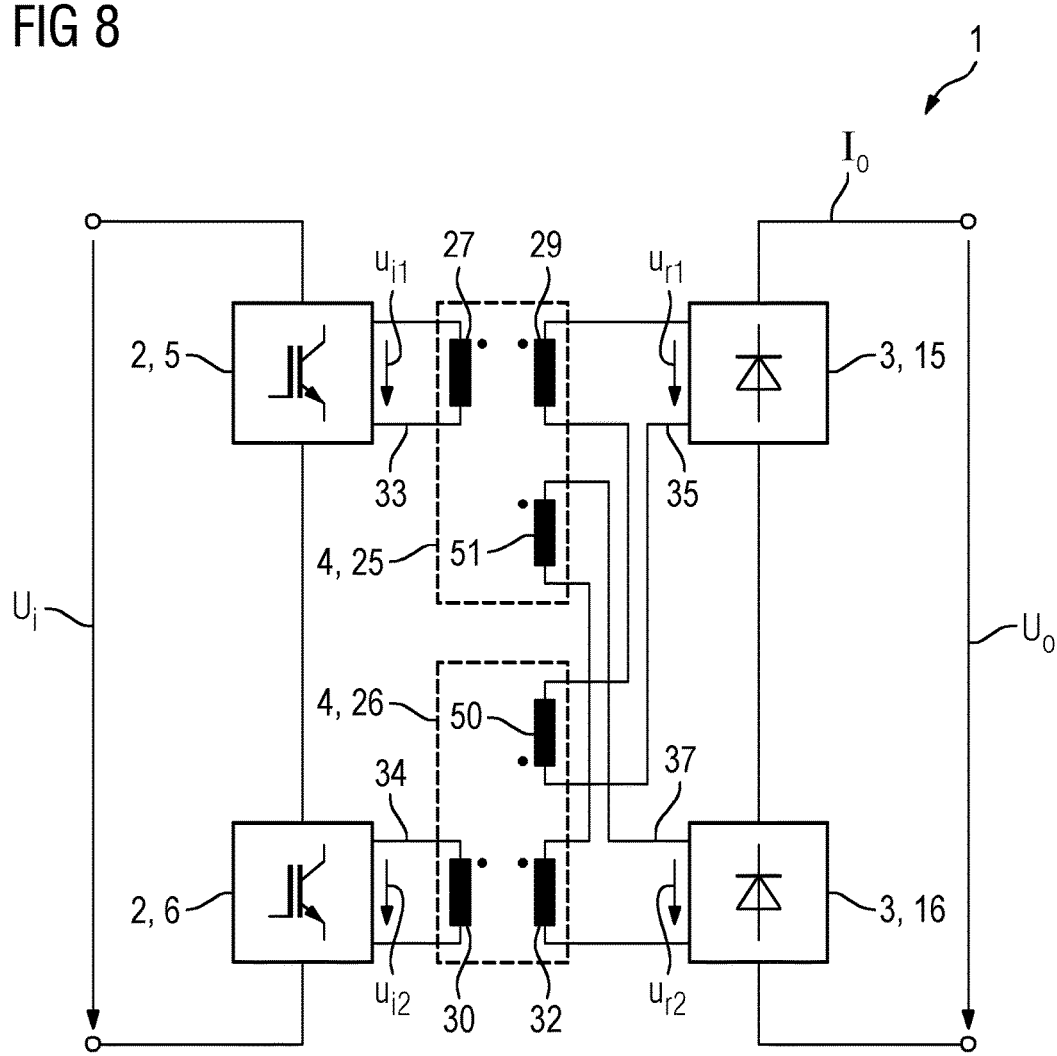
FIGS. 8 to 10 each show further embodiments of the high-voltage generator in a circuit diagram simplified as compared with FIG. 1.
Figure 9:
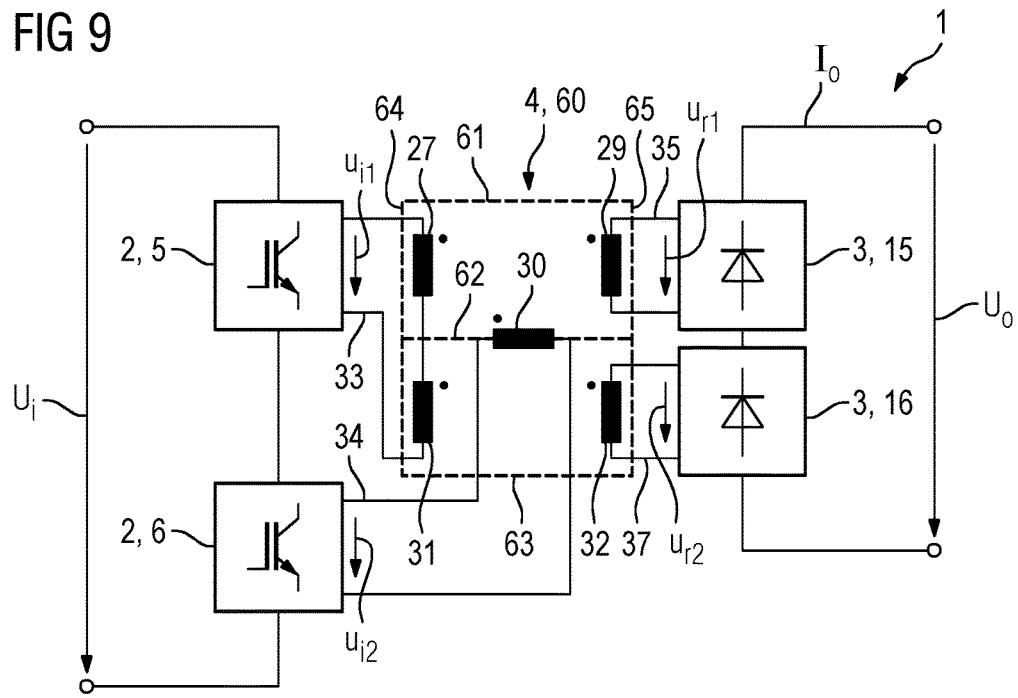
Figure 10:
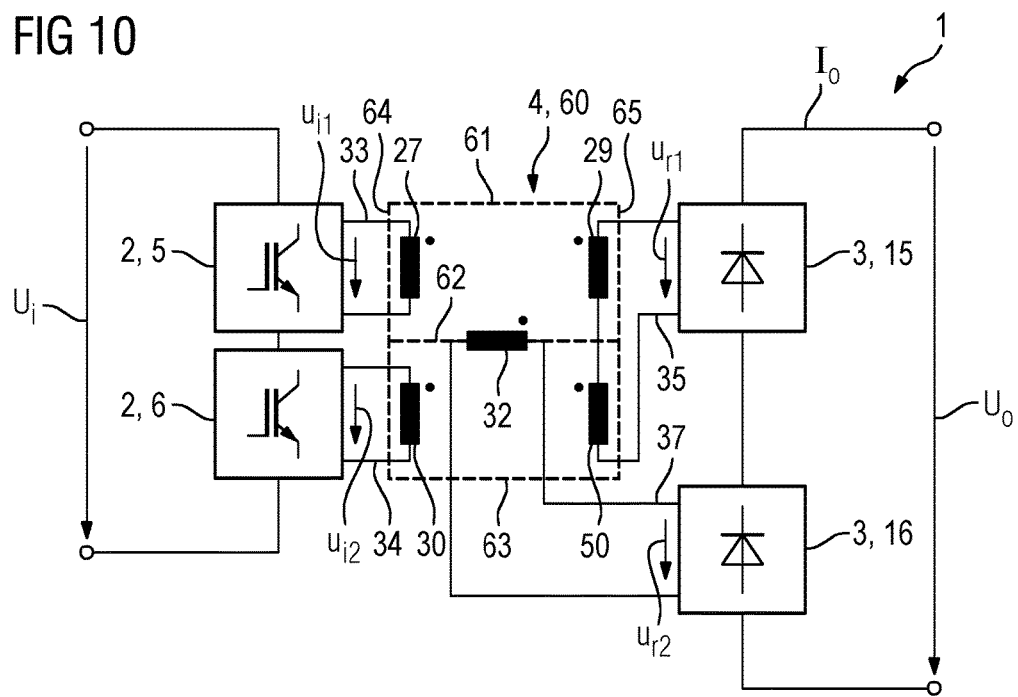

FIGS. 8 to 10 show variants of the topologies described above in simplified form.

The primary winding systems 33 and 34 in the variant according to FIG. 8 contain just the primary windings 27 and 30, respectively. The secondary winding systems 35 and 37 accordingly each include a further secondary winding 50 and 51, respectively, in addition to the secondary windings 29 and 32. The secondary winding 50 in this instance is connected in series in opposing directions with the secondary winding 29 in the secondary winding system 35 and wound on the transformer core 26. The secondary winding 51, on the other hand, is arranged in series in the same direction with the secondary winding 32 in the secondary winding system 37 and wound on the transformer core 25.

The circuit topology according to FIG. 8 thus represents the quasi-mirror-image of the topology according to FIG. 1 in that the winding of the transformer cores 25 and 26 is mirrored between its primary side and its secondary side. The high-frequency generator 1 according to FIG. 8 otherwise corresponds to its mirror image shown in FIG. 1 with regard to design and function except that the rectifier voltages $u_{r1}$ and $u_{r2}$ in this instance are phase-shifted with respect to the inverter voltages $u_{i1}$ and $u_{i2}$ not by 45° but by −45°.

The variant of the high-voltage generator 1 shown in FIG. 9 has in place of the two independent transformer cores 25 and 26 what is known as an E core 60 (i.e., a transformer core with three parallel legs 61,62 and 63 that are connected on both sides by yokes 64 and 65). The E core 60 is designed with no air gap.

The primary winding system 34 in this instance contains only the primary winding 30, which here is wound on the central leg 62 of the E core 60. The two primary windings 27 and 31 of the primary winding system 33 are in this instance connected in series in the same direction with each other and wound on the outer legs 61 and 63, respectively, of the E core 60. Alternatively, the primary windings 27 and 31—as shown in FIG. 8—are wound on the adjacent sections of the yoke 64 in each case.

The secondary windings 29 and 32 of the secondary winding systems 35 and 37, respectively, are likewise wound on the outer legs 61 and 63, respectively, or alternatively on the adjacent sections of the yoke 65 in each case.

The primary winding 30 is here wound on the E core 60 in the same direction as the primary winding 27 and in opposing directions with the primary winding 31 in terms of direction of winding and magnetic flux in the E core 60.

FIG. 10, in turn, shows the mirror-image variant of the topology according to FIG. 9. In this instance, the primary winding system 33 contains just the primary winding 27 and the primary winding system 34 contains just the primary winding 30. The outer legs 61 and 63, respectively, of the E core 60 or, alternatively, the adjacent sections of the yoke 64 in each case, are here wound with these primary windings 27 and 30, respectively.

The secondary winding 32, which in this instance constitutes the only winding of the secondary winding system 37, is wound on the central leg 62 of the E core 60. The secondary winding system 35, on the other hand, includes the two secondary windings 29 and 50, which in this instance are connected in series in the same direction with each other and are wound on the outer legs 61 and 63, respectively, or alternatively on the adjacent sections of the yoke 65 in each case.

The secondary winding 32 is here wound on the E core 60 in the same direction as the secondary winding 29 and in opposing directions with the secondary winding 50 in terms of direction of winding and magnetic flux in the E core 60.

The exemplary embodiments of FIG. 9 and FIG. 10 correspond to the high-frequency generator 1 shown in FIG. 1 with regard to their functioning except that the rectifier voltages $u_{r1}$ and $u_{r2}$ in this instance are phase-shifted with respect to the inverter voltages $u_{i1}$ and $u_{i2}$ not by 45° but by 135° and −135° respectively.

The invention is rendered particularly clear by the exemplary embodiments described above. It is not, however, limited to these exemplary embodiments; indeed further embodiments of the invention can be derived from the claims and the foregoing description.

It is intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The invention claimed is:

1. A high-voltage generator for an X-ray device, the high-voltage generator comprising:
   an input-side inverter unit,
   an output-side rectifier unit, and
   a transformer connected between the inverter unit and the rectifier unit,
   wherein the inverter is configured to generate two inverter voltages phase-shifted with respect to each other that in a normal operating mode have a phase offset of 90° and that are transformed by the transformer into two rectifier voltages that are fed to the rectifier unit such that in no-load operation one of the two rectifier voltages is proportional to the sum of the inverter voltages ($u_{i1}$, $u_{i2}$), while the other of the two rectifier voltages ($u_{r2}$) is proportional to the difference between the inverter voltages ($u_{i1}$, $u_{i2}$).

2. The high-voltage generator as claimed in claim 1, wherein the inverter unit comprises two inverters, each of which feeds an assigned primary winding system with one of the two inverter voltages,
   wherein each of the two primary winding systems contains two series-connected primary windings,
   wherein the transformer has two transformer cores, each of which is wound with one primary winding of the two primary winding systems, and
   wherein the two primary windings in one of the two primary winding systems are connected in series in the same direction while the two primary windings in the other of the two primary winding systems are connected in series in opposing directions.

3. The high-voltage generator as claimed in claim 2, wherein the two inverters are connected in series across an input voltage ($U_i$).

4. The high-voltage generator as claimed in claim 3, wherein the rectifier unit comprises a passive rectifier.

5. The high-voltage generator as claimed in claim 2,
wherein the two inverters are connected in parallel in an input voltage, and
wherein each of the two inverters has two half-bridges in each case that are connected in each case between two series-connected intermediate DC circuits.

6. The high-voltage generator as claimed in claim 5, wherein the rectifier unit comprises a passive rectifier.

7. The high-voltage generator as claimed in claim 2, wherein the rectifier unit comprises a passive rectifier.

8. The high-voltage generator as claimed in claim 1,
wherein the rectifier unit comprises two rectifiers connected in series across an output voltage that are each fed with one of the two rectifier voltages via two secondary winding systems,
wherein each of the two secondary winding systems contains two series-connected secondary windings,
wherein the transformer has two transformer cores, each of which is wound with one secondary winding of the two secondary winding systems, and
wherein the two secondary windings in one of the two secondary winding systems are connected in series in the same direction while the two secondary windings in the other of the two secondary winding systems are connected in series in opposing directions.

9. The high-voltage generator as claimed in claim 8, wherein the rectifier unit comprises a passive rectifier.

10. The high-voltage generator as claimed in claim 1, wherein the transformer comprises a transformer core with three parallel legs that are connected on both sides by yokes.

11. The high-voltage generator as claimed in claim 10,
having a first primary winding system that contains two primary windings connected in series and is fed by the inverter unit with one of the two inverter voltages, and
having a second primary winding system that contains a further primary winding and is fed by the inverter unit with the other of the two inverter voltages,
wherein the central leg of the transformer core is wound with the primary winding of the second primary winding system, and
wherein the outer legs or the adjacent sections of one of the two yokes are wound with the two primary windings of the first primary winding system such that one of the two primary windings of the first primary winding system is oriented in the same direction as the primary winding of the second primary winding system while the other of the two primary windings of the first primary winding system is oriented in opposing directions with the primary winding of the second primary winding system.

12. The high-voltage generator as claimed in claim 11, wherein the rectifier unit comprises a passive rectifier.

13. The high-voltage generator as claimed in claim 10,
having a first secondary winding system that contains two secondary windings connected in series and via which the rectifier unit is fed with one of the two rectifier voltages, and
having a second secondary winding system that contains a further secondary winding and via which the rectifier unit is fed with the other of the two rectifier voltages, and
wherein the central leg of the transformer core is wound with the secondary winding of the second secondary winding system, and
wherein the outer legs or the adjacent sections of one of the two yokes are wound with the two secondary windings of the first secondary winding system such that one of the two secondary windings of the first secondary winding system is oriented in the same direction as the secondary winding of the second secondary winding system while the other of the two secondary windings of the first secondary winding system is oriented in opposing directions with the secondary winding of the second secondary winding system.

14. The high-voltage generator as claimed in claim 13, wherein the rectifier unit comprises a passive rectifier.

15. The high-voltage generator as claimed in claim 10, wherein the rectifier unit comprises a passive rectifier.

16. The high-voltage generator as claimed in claim 1, wherein the rectifier unit comprises a passive rectifier.

* * * * *